(12) United States Patent
Shumaker et al.

(10) Patent No.: US 9,697,916 B2
(45) Date of Patent: Jul. 4, 2017

(54) AUTOMATED SYSTEM FOR ON-LINE MONITORING AND DIAGNOSTICS OF ROD POSITION INDICATION COILS FOR NUCLEAR POWER PLANTS

(75) Inventors: Brent D. Shumaker, Knoxville, TN (US); Hashem M. Hashemian, Knoxville, TN (US); Gregory W. Morton, Knoxville, TN (US); Danny D. Beverly, Knoxville, TN (US); Casey D. Sexton, Knoxville, TN (US)

(73) Assignee: Analysis And Measurement Corporation, Knoxville, TN (US)

( * ) Notice: Subject to any disclaimer, the term of this patent is extended or adjusted under 35 U.S.C. 154(b) by 1673 days.

(21) Appl. No.: 12/351,748

(22) Filed: Jan. 9, 2009

(65) Prior Publication Data

US 2017/0160219 A1    Jun. 8, 2017

Related U.S. Application Data

(60) Provisional application No. 61/020,054, filed on Jan. 9, 2008.

(51) Int. Cl.
*G21C 17/00* (2006.01)
(52) U.S. Cl.
CPC ........ *G21C 17/00* (2013.01); *G21Y 2002/204* (2013.01)
(58) Field of Classification Search
CPC ......... Y02E 10/00; Y02E 10/30; Y02E 10/31; Y02E 10/32; Y02E 10/39; Y02E 10/40; G21C 1/00; G21C 1/01; G21C 3/00; G21C 3/02; G21C 3/30; G21C 3/38; G21C 3/40; G21C 3/41; G21C 12/00; G21C 12/12; G21C 7/12; G21C 7/36; G21C 7/10; G21D 1/00; G21D 2003/00
USPC ............... 376/245, 258, 240, 259, 233, 215
See application file for complete search history.

(56) References Cited

U.S. PATENT DOCUMENTS

| | | | | |
|---|---|---|---|---|
| 3,858,191 A * | 12/1974 | Neuner et al. | ........... | 340/870.02 |
| 3,895,351 A * | 7/1975 | Neuner et al. | ........... | 340/870.22 |
| 4,629,983 A * | 12/1986 | Boomgaard et al. | .... | 324/207.19 |
| 4,646,012 A * | 2/1987 | Feilchenfeld et al. | ... | 324/207.12 |
| 4,714,926 A * | 12/1987 | Neuner et al. | ........... | 340/870.36 |
| 5,142,226 A * | 8/1992 | Sakamoto et al. | ....... | 324/207.24 |
| 5,392,321 A * | 2/1995 | Gaussa et al. | ................ | 376/258 |
| 5,563,922 A * | 10/1996 | Beltz et al. | ................... | 376/258 |
| 5,568,528 A * | 10/1996 | Gaussa et al. | ................ | 376/258 |
| 6,606,367 B2 * | 8/2003 | Halluin et al. | ................ | 376/245 |
| 2009/0252272 A1 * | 10/2009 | Hashemian et al. | ......... | 376/258 |

* cited by examiner

*Primary Examiner* — Marshall O'Connor
(74) *Attorney, Agent, or Firm* — Pitts & Lake, P.C.

(57) ABSTRACT

An automated system for on-line monitoring and coil diagnostics of rod position indicator (RPI) coils coil diagnostic, or RPI coil diagnostic system. The RPI coil diagnostic system performs coil diagnostics for a RPI system in a nuclear power plant. The RPI coil diagnostic system is in electrical communication with and monitors the outputs of the detector coils. The RPI coil diagnostic system measures characteristics of the detector coils that are indicative of the health of the detector coils and/or the connections between the detector coils and the RPI electronics.

13 Claims, 6 Drawing Sheets

AUTOMATED SYSTEM FOR ON-LINE MONITORING AND DIAGNOSTICS OF ROD POSITION INDICATION COILS FOR NUCLEAR POWER PLANTS

CROSS-REFERENCE TO RELATED APPLICATIONS

This application claims the benefit of U.S. Provisional Application No. 61/020,054, filed Jan. 9, 2008.

STATEMENT REGARDING FEDERALLY-SPONSORED RESEARCH OR DEVELOPMENT

Not Applicable

BACKGROUND OF THE INVENTION

1. Field of Invention

This invention relates to a coil diagnostic system for monitoring rod position indicator coils in a nuclear power plant. More specifically, this invention relates to a system performing on-line rod coil diagnostics for rod position indication systems.

2. Description of the Related Art

In a Pressurized Water Reactor (PWR), the power level of the reactor 10 is controlled by inserting and retracting the control rods 12, which for purposes of this application include the shutdown rods, into the reactor core 14. The control rods are moved by the Control Rod Drive Mechanisms (CRDM), which are electromechanical jacks that raise or lower the control rods in increments. The CRDM includes a lift coil $DM_L$, a moveable gripper coil $DM_M$, and a stationary gripper coil $DM_S$ that are controlled by the Rod Control System (RCS) and a ferromagnetic drive rod that is coupled to the control rod and moves within the pressure housing 16. The drive rod includes a number of circumferential grooves at ⅝ inch intervals ("steps") that define the range of movement for the control rod. A typical drive rod contains approximately 231 grooves, although this number may vary. The moveable gripper coil mechanically engages the grooves of the drive rod when energized and disengages from the drive rod when de-energized. Energizing the lift coil raises the moveable gripper coil (and the control rod if the moveable gripper coil is energized) by one step. Energizing the moveable gripper coil and de-energizing the lift coil moves the control rod down one step. Similarly, when energized, the stationary gripper coil engages the drive rod to maintain the position of the control rod and, when de-energized, disengages from the drive rod to allow the control rod to move. The RCS includes the logic cabinet and the power cabinet. The logic cabinet receives manual demand signals from an operator or automatic demand signals from Reactor Control and provides the command signals needed to operate the shutdown and control rods according to a predetermined schedule. The power cabinet provides the programmed dc current to the operating coils of the CRDM.

Current PWR designs have no direct indication of the actual position of each control rod. Instead, step counters associated with the control rods are maintained by the RCS and rod position indication (RPI) systems to monitor the positions of the control rods within the reactor. The associated step counter is incremented or decremented when movement of a control rod is demanded and successful movement is verified. Because the step counter only reports the expected position of the control rod, certain conditions can result in the step counter failing and deviating from the actual position of the control rod. In certain situations where the actual position of the control rod is known, the step counter can be manually adjusted to reflect the actual position. However, if the actual position of the control rod is not known, a plant shutdown may be required so that the step counters to be initialized to zero while the control rods are at core bottom.

The RPI systems derive the axial positions of the control rods by direct measurement of drive rod positions. Currently both analog rod position indication (ARPI) systems and digital rod position indication (DRPI) systems are in use in PWRs. The conventional DRPI systems have been in service for over 30 years in nuclear power stations worldwide and are currently being used as the basis for the rod position indication systems in the new Westinghouse AP1000 designs.

A conventional DRPI system includes two coil stacks for each control rod and the associated DPRI electronics for processing the signals from the coil stacks. Each coil stack is an independent channel of coils placed over the pressure housing. Each channel includes 21 coils. The coils are interleaved and positioned at 3.75 inch intervals (6 steps). The DRPI electronics for each coil stack of each control rod are located in a pair of redundant data cabinets (Data Cabinets A and B). Although intended to provide independent verification of the control rod position, conventional RPI systems are not accurate to fewer than 6 steps. The overall accuracy of a DRPI system is considered to be accurate within ±3.75 inches (6 steps) with both channels functioning and ±7.5 inches using a single channel (12 steps). In contrast to the conventional DRPI system, a conventional ARPI system determines the position based on the amplitude of the dc output voltage of an electrical coil stack linear variable differential transformer. The overall accuracy of a properly calibrated ARPI system is considered to be accurate within ±7.2 inches (12 steps). Neither conventional ARPI systems nor conventional DRPI systems are capable of determining the actual positions of the control rods. In the event of a step counter failure, plant shutdown for re-initialization of the step counter is still required because the approximate positions of the control rods reported by conventional RPI are of little or no value.

It should be noted that for purposes of this application, the phrase "control rod" is used generically to refer to a unit for which separate axial position information is maintained, such as a group of control rods physically connected in a cluster assembly. The number of control rods varies according to the plant design. For example, a typical four-loop PWR has 53 control rods. Each control rod requires its own sets of coils having one or more channels and the DRPI electronics associated with each channel. Thus, in a typical four-loop PWR, the entire DPRI system would include 53 coil stacks, each having two independent channels, and 106 DPRI electronics units. Further, in this application, the phrase "coil stack" is used generically to refer to the detector coils associated with each control rod and should be understood to include either or both channels of detector coils. Thus, a measurement across a coil stack contemplates the value across both channels combined and/or the value across a single channel.

Unfortunately, aging and obsolescence issues have led to an increase in problems with conventional DRPI systems including analog card failures and coil cable connection problems that, in some cases, may result in unplanned reactor trips. These problems, along with plans for plant life extension, have prompted the industry to actively seek viable options to monitor the health and accuracy of the DRPI systems and/or to replace failing systems in order to ensure reliable plant operations for decades to come.

In addition to obsolescence concerns, the lack of diagnostic capabilities is a significant problem. Conventional RPI systems cannot provide any diagnostic information on their health other than the current rod position indication. Accordingly, diagnostics of the RPI system is limited to periods when the PWR is offline. Currently, the offline RPI coil diagnostic procedures include performing resistance and inductance measurements at high frequencies (frequencies above line frequency, e.g., 100, 1,000, and 10,000 hertz) on the RPI coils during each refueling outage after the reactor head is re-connected and before the RPI system is energized using traditional inductance, capacitance, and resistance (LCR) meters. By way of example, in a four loop PWR with 53 control rod assemblies, performing diagnostics on each coil requires a total of 2226 measurements. This traditional testing takes 8-12 hours and costs hundreds of thousands of dollars. Moreover, this testing may be skipped during some outages in an effort to reduce operating costs and/or plant downtime. The primary benefit of offline diagnostics is to catch obvious failures resulting from reassembly of the reactor. However, in between refueling outages, RPI failures can occur without warning, which leads to increased costs for the plant, especially if replacement parts cannot be obtained in a timely manner. Without active monitoring, plant engineers cannot identify problems developing in the RPI systems and take preemptive actions, such as obtaining necessary replacement parts ahead of time and replacing failing components at the next scheduled outage; rather plants must begin remedial actions after an actual failure occurs.

Beyond the technical problems of the conventional DRPI systems, regulatory issues exist. Many existing PWRs are approaching the end of qualified life for several components of the conventional DRPI systems during the next decade and are actively seeking replacement options at this time. There has been a significant push in recent years for plants to replace aging analog systems with digital systems made from commercially-available off-the-shelf parts. Using readily-available commercial parts provide plants more options for replacement in the future.

BRIEF SUMMARY OF THE INVENTION

An automated system for on-line monitoring and coil diagnostics of rod position indicator (RPI) coils coil diagnostic, or RPI coil diagnostic system, is described herein. The RPI coil diagnostic system performs coil diagnostics for a RPI system in a nuclear power plant. The RPI coil diagnostic system is in electrical communication with and monitors the outputs of the detector coils. The RPI coil diagnostic system measures characteristics of the detector coils that are indicative of the health of the detector coils and/or the connections between the detector coils and the RPI electronics.

The RPI coil diagnostic system can be implemented as a complete system in a new plant design or a supplemental system that works in conjunction with portions of a conventional DRPI system to provide position measurements with improved resolution compared to the conventional DRPI. The RPI coil diagnostic system includes RPI coil diagnostic electronics that are connected to and monitor the electrical signals from the plurality of detector coils and the reference voltage. The RPI coil diagnostic electronics include a data acquisition unit in communication with an interface device. The RPI coil diagnostic data acquisition unit has a number of analog inputs equal to the number of coils in a single channel plus an additional input for the reference line. The electronic signals produced by each DRPI coil are sampled by RPI coil diagnostic data acquisition unit.

The RPI coil diagnostic processing unit receives RPI coil diagnostic data from the RPI coil diagnostic electronics including ac voltage measurements and ac current measurements. The RPI coil diagnostic processing unit uses the RPI coil diagnostic data to calculate the impedance at each of the test points by dividing the complex voltage measurements by the complex current measurements. Because, the excitation frequency of the coils is known (to be the line frequency), the RPI coil diagnostic processing unit derives the respective resistances and reactive inductances for the detector coils from the calculated impedance. Deviations in the impedances, resistances, inductances from baseline values or the expected linear relationships within a coil set indicate a potential or actual problem with the detector coil or its associated connections.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An automated system for on-line monitoring and coil diagnostics of rod position indicator (RPI) coils coil diagnostic, or RPI coil diagnostic system, is described in detail herein and illustrated in the accompanying figures. The RPI coil diagnostic system performs diagnostics for a digital rod position indication (DRPI) system in a nuclear power plant. The RPI coil diagnostic system is in electrical communication with and monitors the outputs of the detector coils. The RPI coil diagnostic system measures identifiable electrical characteristics of the detector coils that are indicative of the health of the detector coils and/or the connections between the detector coils and the DRPI system. The identifiable electrical characteristic can be inductance, impedance, resistance, or other electrical characteristics which are measurable for diagnostic purposes.

Figure 1:
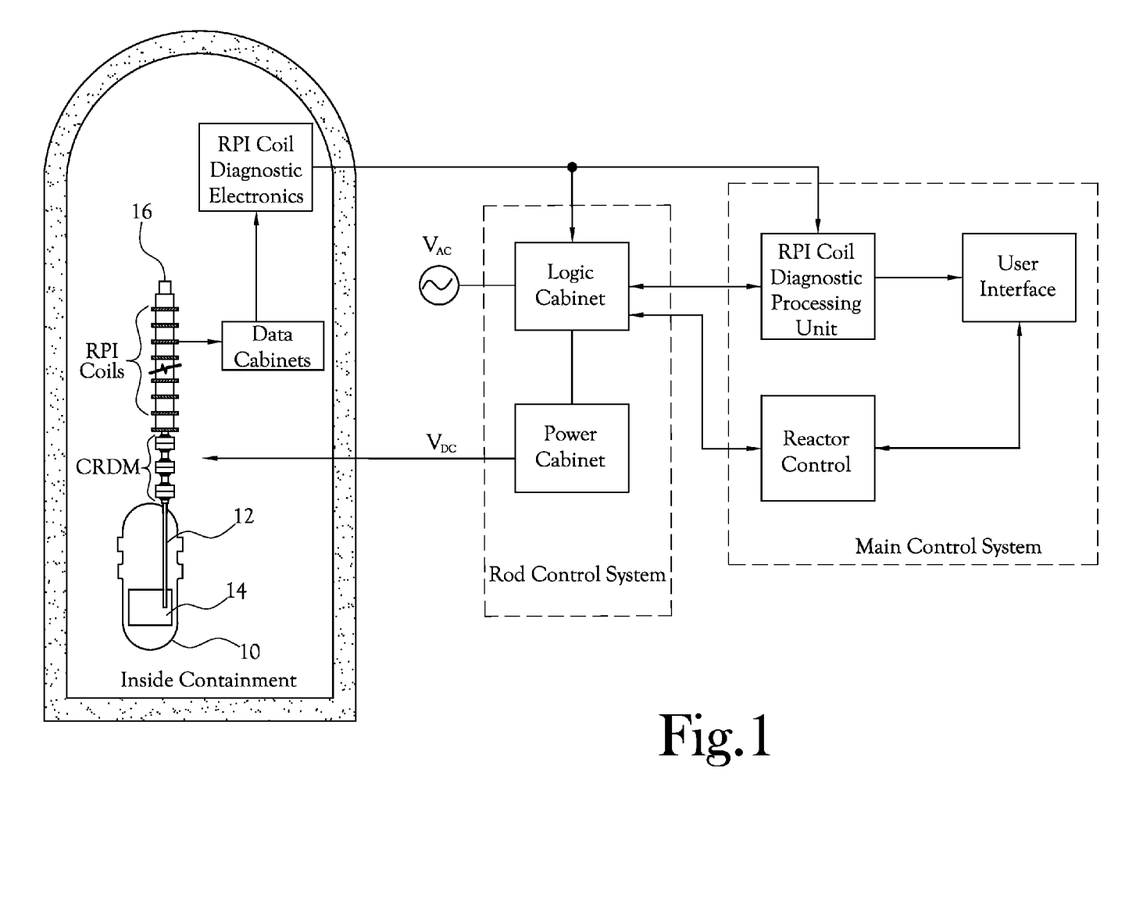
FIG. 1 is a block diagram of the RPI coil diagnostic system in a pressurized water reactor (PWR)

FIG. 1 is a block diagram of an RPI coil diagnostic system in a pressurized water reactor (PWR). A brief overview of the systems of a PWR that are relevant to the RPI coil diagnostic system can be found in the description of the related art. The RPI coil diagnostic system can be implemented as a complete system in a new plant design or a supplemental system that works in conjunction with portions of a conventional RPI system to provide self-diagnostic capabilities not available with a conventional RPI system. In the illustrated embodiment, the RPI coil diagnostic system includes the RPI coil diagnostic electronics located inside containment and the RPI coil diagnostic processing unit located outside containment in the main control room. The RPI coil diagnostic electronics sample the electrical signals from the detector coils and transmit the sampled data to the RPI coil diagnostic processing unit. The RPI coil diagnostic processing unit evaluates the sampled data from the RPI coil diagnostic electronics to determine the health of the detector coils and/or the associated connections. The diagnostic information generated by the RPI coil diagnostic processing unit is displayed to the reactor operators via a user interface and may be used to identify deteriorating components and other problems prior to actual failure.

Figure 2:
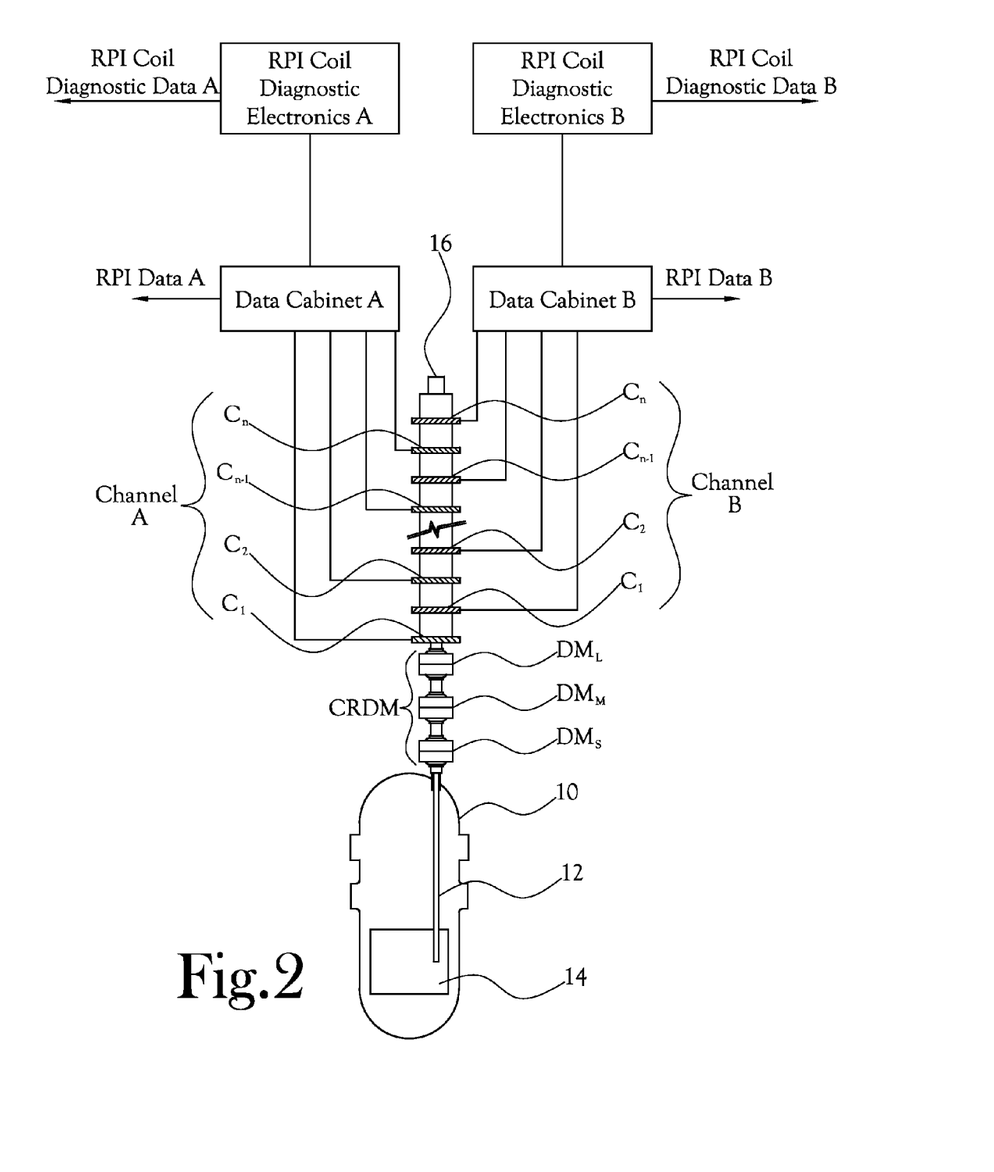
FIG. 2 is a block diagram of one embodiment of the inside containment portions of the RPI coil diagnostic system.

FIG. 2 illustrates one embodiment of the RPI coil diagnostic system used to retrofit plants with existing conventional DRPI systems. The conventional DRPI system consists of two redundant components (Data Cabinets A and B) located inside the containment area and in communication with the detector coils of the coil stacks mounted on the rod control housing above the reactor. In this embodiment, the RPI coil diagnostic electronics are connected to the data cabinets at a point between the input from the existing detector coils and the conventional DRPI electronics allowing the RPI coil diagnostic electronics to sample the DRPI coil currents and convert them into digital signals. The digital signal is then transmitted to the RPI coil diagnostic processing unit in the main control room.

Figure 3:
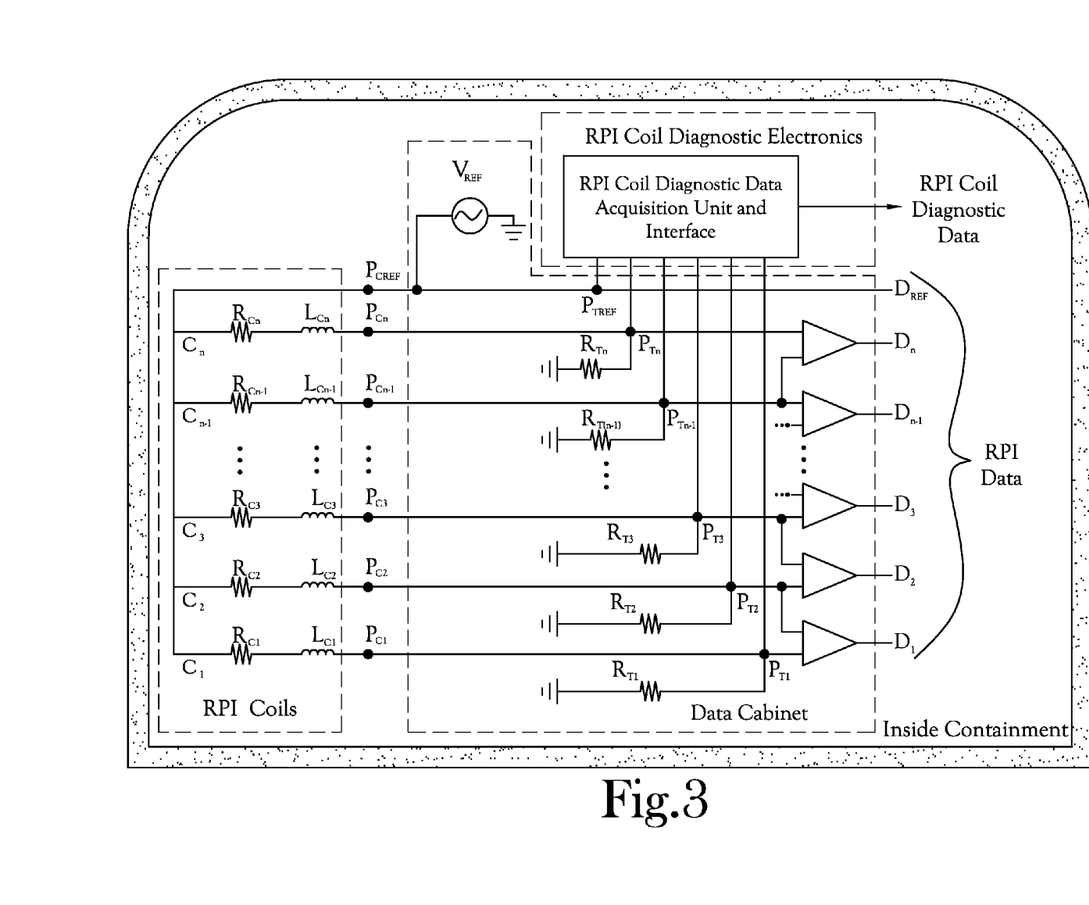
FIG. 3 shows of one embodiment of the RPI coil diagnostic electronics retrofitted to an existing conventional DRPI system.

FIG. 3 is a diagram of one embodiment of the RPI coil diagnostic electronics used in the retrofit application of FIG. 2. In this embodiment, the RPI coil diagnostic electronics are connected to the test points $P_{T1}$-$P_{Tn}$, $P_{TREF}$ in the data cabinets of the conventional DRPI. The test points $P_{T1}$-$P_{Tn}$, $P_{TREF}$ provide access to the electrical signals from the plurality of detector coils $C_1$-$C_n$ and the reference voltage $V_{REF}$. In the prior art, the primary use of the test points $P_{T1}$-$P_{Tn}$, $P_{TREF}$ is for manual diagnostics of the detector coils $C_1$-$C_n$ and the connections $P_{C1}$-$P_{Cn}$, $P_{CREF}$ when the nuclear power plant is offline. As previously discussed, these manual offline diagnostics occur at higher frequencies as compared to the operating frequency (i.e., 60 Hz in the U.S.) and require the technicians to connect 2,226 different sets of test points to the LCR meter.

The RPI coil diagnostic electronics include a data acquisition unit in communication with an interface unit. Each control rod has one RPI coil diagnostic electronics unit for each independent channel of the coil stack associated with the control rod. For example, a PWR having 53 control rods monitored by redundant DPRI systems (53 coil stacks with two independent channels) would have 106 ADPRI electronics (53 per data cabinet). In one embodiment, each ADRPI data acquisition unit has a number of analog inputs equal to the number of coils in a single channel plus an additional input for the reference line. The electronic signals produced by each DRPI coil are sampled by RPI coil diagnostic data acquisition unit. The interface unit is used to transmit the sampled data to the RPI coil diagnostic processing unit located outside containment. The interface unit is selected to have sufficient data transmission speeds to send the sampled data to the RPI coil diagnostic processing unit in real time. By way of example, one suitable device for performing the functions of the RPI coil diagnostic data acquisition unit and the interface unit is the CompactRIO remote high speed interface system produced by National Instruments Corporation, which includes swappable I/O modules connected to an FPGA for acquiring various types of signals including the voltage and current signals used by the RPI coil diagnostic system and a high speed interface allowing an external computer to communicate with the FPGA at data rates up to 50 MB/s. One skilled in the art will recognize that the general specifications for the RPI coil diagnostic electronics are not intended to be limiting and that deviations intended to acquire sufficient data containing information from which the positions of the control rods to a single step can be derived are considered to remain with the scope and spirit of the appended claims.

The RPI coil diagnostic data acquisition unit and the interface receive the electrical signals from the plurality of DRPI coils when the DRPI coils are energized. In other words, the RPI coil diagnostic system begins operating during plant startup when the DRPI system is energized and continues during normal operation of the PWR. Accordingly, the RPI coil diagnostic system begins sampling the electrical signals received from all of the detector coils early in the startup phase. Within a span of a few seconds to a few minutes, the RPI coil diagnostic system can process the sampled data from all detector coils and identify actual or potential problems with the approximately 2,226 detector coils and/or the connections thereto. Once the PWR is online, the RPI coil diagnostic system continues diagnostic monitoring as it continues to sample and process the electrical signals from the detector coils allowing actual or potential problems with the detector coils to be identified before a failure scenario occurs. As a result, preventative maintenance can occur during regularly scheduled outages rather than during an unplanned shutdown from a reactor trip to a failure in the DRPI system.

Under normal plant operating conditions, the diagnostic measurements are made at the operating frequency supplied by the detector coil power supply, which will typically be a low voltage at either 50 or 60 hertz depending upon the locality of the PWR. At times when the DRPI system is not energized, for example, during a plant shutdown, the RPI coil diagnostic system can be used to rapidly perform diagnostics on some or all of the detector coils by energizing the selected coils. In one embodiment, the detector coils are energized by an external power supply. Use of an external power supply also allows the selection of a different frequency voltage source.

Figure 4:
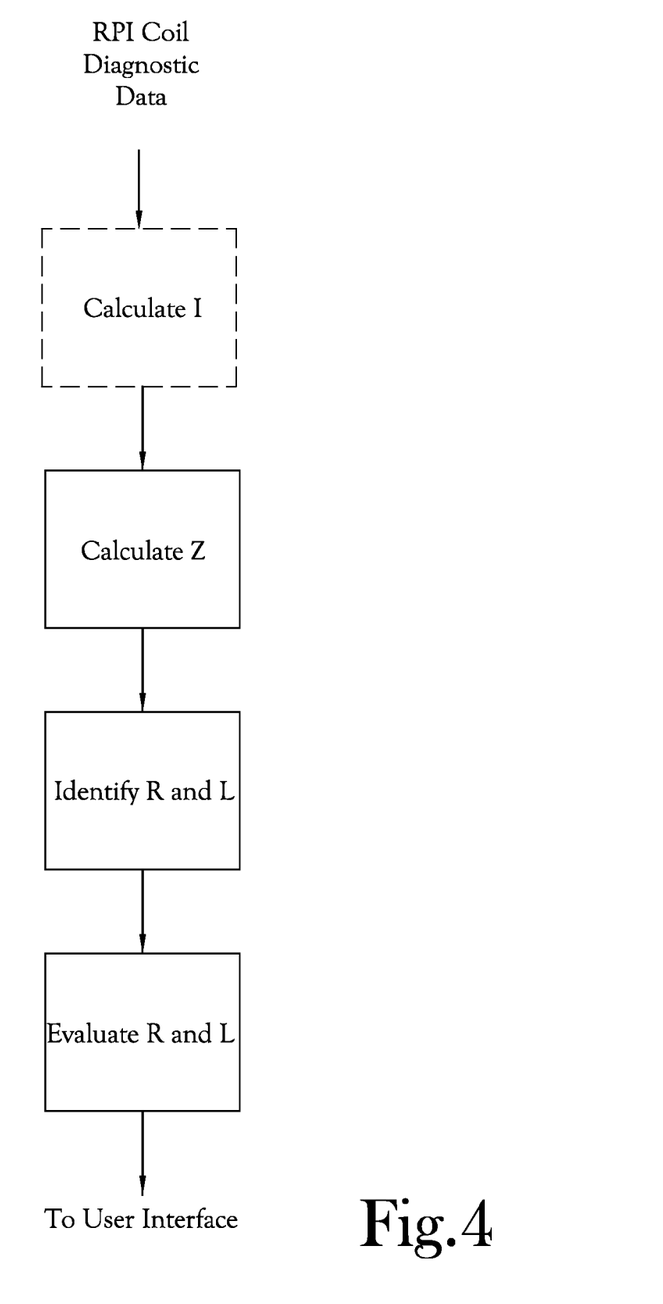
FIG. 4 is a flow chart of one embodiment of the process performed by the RPI coil diagnostic processing unit to determine the health of the detector coils.

FIG. 4 illustrates one embodiment of the process applied by the processing unit of the RPI coil diagnostics system. The RPI coil diagnostic processing unit receives RPI coil diagnostic data from the RPI coil diagnostic electronics including ac voltage measurements. More specifically, the ac voltages at the test points $P_{T1}$-$P_{Tn}$, $P_{TREF}$ are measured. The ac currents at the test points $P_{T1}$-$P_{Tn}$ may be measured or calculated. In one embodiment, the ac current at the test points $P_{T1}$-$P_{Tn}$ are calculated from the ac voltages because the resistance from the test points $P_{T1}$-$P_{Tn}$ to ground is known. The ac current is calculated by:

$$\tilde{I}_{Tn} = \frac{\tilde{V}_{Tn}}{R_{Tn}}. \tag{1}$$

In another embodiment, the RPI coil diagnostic system measures the coil currents directly eliminating the need to calculate them.

Using the RPI coil diagnostic data, the RPI coil diagnostic processing unit calculates the impedances at each of the test points $P_{T1}$-$P_{Tn}$ associated with the detector coils. The RPI coil diagnostic processing unit calculates the impedance according to the equation:

$$\tilde{Z}_n = \frac{(\tilde{V}_{REF} - \tilde{V}_{Tn})}{\tilde{I}_{Tn}}. \quad (2)$$

The RPI coil diagnostic processing unit uses the calculated impedances to derive the respective resistances and reactive inductance for the detector coils $C_1$-$C_n$. In one embodiment where the detectors coils are energized by a known source, such an ac voltage source at line frequency, the RPI coil diagnostic processing unit calculates the resistances and inductances using the known line frequency. In another embodiment where the source frequency is unknown, the RPI coil diagnostic processing unit determines the frequency at the reference point $P_{TREF}$. The RPI coil diagnostic processing unit calculates the resistance and inductance for each the detector coils $C_1$-$C_n$ by the equation:

$$\tilde{Z}_n = R_n + j(2\pi f v_{REF} L_n). \quad (3)$$

A high resistance indicates a bad connection. A low resistance or inductance indicates shorted turns in the detector coil winding.

To identify problems, either actual or potential, the calculated resistance and inductance are compared to a reference resistance and reference inductance for each of the detector coils $C_1$-$C_n$. In one embodiment, the RPI coil diagnostic system is calibrated by moving the control rods through their entire range of motion and obtaining and storing baseline values for the impedances. Any or all of the calculated or baseline/reference resistances, inductances, and the impedances for the detector coils $C_1$-$C_n$ are displayed for the plant technicians at the user interface. The calibration process may be repeated and the results averaged, if necessary, to create an accurate set of baseline impedances. Thus, the baseline may include both the impedance when the drive rod passes through the detector coil and the impedance when the drive rod is not in the detector coil. In another embodiment, problems are detected without the benefit of baseline data simply by looking for deviations in the relationships of the sampled data.

A prototype of the RPI coil diagnostic system was tested at the Farley nuclear power plant using a single channel of detector coils for one control rod when withdrawing the control rod 226 steps out of core, inserting the control rod 226 steps into the core, and during rod drop testing. Tables 1 and 2 are based on the data obtained during testing of the prototype.

Table 1 shows the impedance, the resistance, and the inductance at a frequency of 60 hertz, calculated as described above while the control rod is fully inserted into the reactor core. Within a coil stack, the resistance values, the inductance values, and the impedance values have a substantially linear relationship. During the operation of a DRPI system, the detector coil impedances (and resistances and inductances) vary based on the positions of the control rods. In Table 1, the values for detector coil 1 deviate from the substantially linear relationship of detector coils 2-21 because the drive rod continues to influence the magnetic field of detector coil 1 when the control rod is fully inserted into the reactor core (i.e., the rod remains within Coil 1 when fully inserted).

TABLE 1

Data Set #1: Resistance, Inductance, and Impedance @ 60 hertz

| Detector Coil | Resistance (Ohms) | Inductance (mH) | Impedance (Ohms) |
|---|---|---|---|
| 1 | 13.36 | 36.08 | 13.36 + j13.60 |
| 2 | 8.15 | 42.67 | 8.15 + j16.09 |
| 3 | 7.40 | 42.09 | 7.40 + j15.87 |
| 4 | 7.61 | 42.26 | 7.61 + j15.93 |
| 5 | 7.44 | 42.46 | 7.44 + j16.01 |
| 6 | 7.51 | 42.22 | 7.51 + j15.92 |
| 7 | 7.68 | 42.20 | 7.68 + j15.91 |
| 8 | 7.57 | 41.83 | 7.57 + j15.77 |
| 9 | 7.54 | 42.20 | 7.54 + j15.91 |
| 10 | 7.74 | 42.16 | 7.74 + j15.89 |
| 11 | 7.77 | 41.74 | 7.77 + j15.74 |
| 12 | 7.71 | 41.64 | 7.71 + j15.70 |
| 13 | 7.75 | 41.44 | 7.75 + j15.62 |
| 14 | 7.70 | 41.39 | 7.70 + j15.60 |
| 15 | 7.95 | 41.39 | 7.95 + j15.61 |
| 16 | 7.82 | 41.07 | 7.82 + j15.48 |
| 17 | 8.02 | 40.56 | 8.02 + j15.29 |
| 18 | 7.85 | 40.09 | 7.85 + j15.11 |
| 19 | 8.04 | 39.67 | 8.04 + j14.96 |
| 20 | 8.02 | 39.13 | 8.02 + j14.75 |
| 21 | 7.96 | 38.25 | 7.96 + j14.42 |

Table 2 shows data for a coil stack with the control rod fully withdrawn from the reactor core. Deviations from the linear relationship are indicative of a potential or actual problem. From the data, it can be seen that the resistance of coil 4 is anomalous, indicating a potential problem with that coil or the associated connections. In this instance, the deviation is not sufficient to impair the DRPI operation or to cause a reactor trip but warrants further monitoring.

TABLE 2

Data Set #2: Resistance, Inductance, and Impedance @ 60 hertz

| Detector Coil | Resistance (Ohms) | Inductance (mH) | Impedance (Ohms) |
|---|---|---|---|
| 1 | 6.39 | 42.55 | 6.39 + j16.04 |
| 2 | 6.49 | 44.19 | 6.49 + j16.66 |
| 3 | 6.58 | 44.17 | 6.58 + j16.65 |
| 4 | 8.76 | 45.89 | 8.76 + j17.30 |
| 5 | 6.64 | 44.39 | 6.64 + j16.73 |
| 6 | 6.63 | 43.99 | 6.63 + j16.58 |
| 7 | 6.72 | 44.09 | 6.72 + j16.62 |
| 8 | 6.69 | 43.95 | 6.69 + j16.57 |
| 9 | 6.80 | 44.21 | 6.80 + j16.67 |
| 10 | 6.85 | 43.46 | 6.85 + j16.38 |
| 11 | 6.85 | 43.71 | 6.85 + j16.48 |
| 12 | 6.97 | 43.56 | 6.97 + j16.42 |
| 13 | 6.96 | 43.15 | 6.96 + j16.27 |
| 14 | 7.14 | 43.79 | 7.14 + j16.51 |
| 15 | 7.08 | 43.20 | 7.08 + j16.29 |
| 16 | 7.03 | 42.42 | 7.03 + j15.99 |
| 17 | 7.07 | 42.30 | 7.07 + j15.95 |
| 18 | 7.10 | 42.18 | 7.10 + j15.90 |
| 19 | 7.10 | 42.54 | 7.10 + j16.04 |
| 20 | 7.15 | 42.02 | 7.15 + j15.84 |
| 21 | 8.16 | 39.06 | 8.16 + j14.73 |

In alternate embodiments, the RPI coil diagnostic data may include measurements at other frequencies or at other points which provide for calculation of other electrical characteristics which are measurable for diagnostic purposes without departing from the spirit and scope of the present invention. Measurements obtained while exciting the detector coils with a dc source would be the equivalent of an ac source with a frequency of zero hertz and would produce an impedance without any significant imaginary component. In other words, the impedance would simply appear as the dc resistance.

Figure 5:
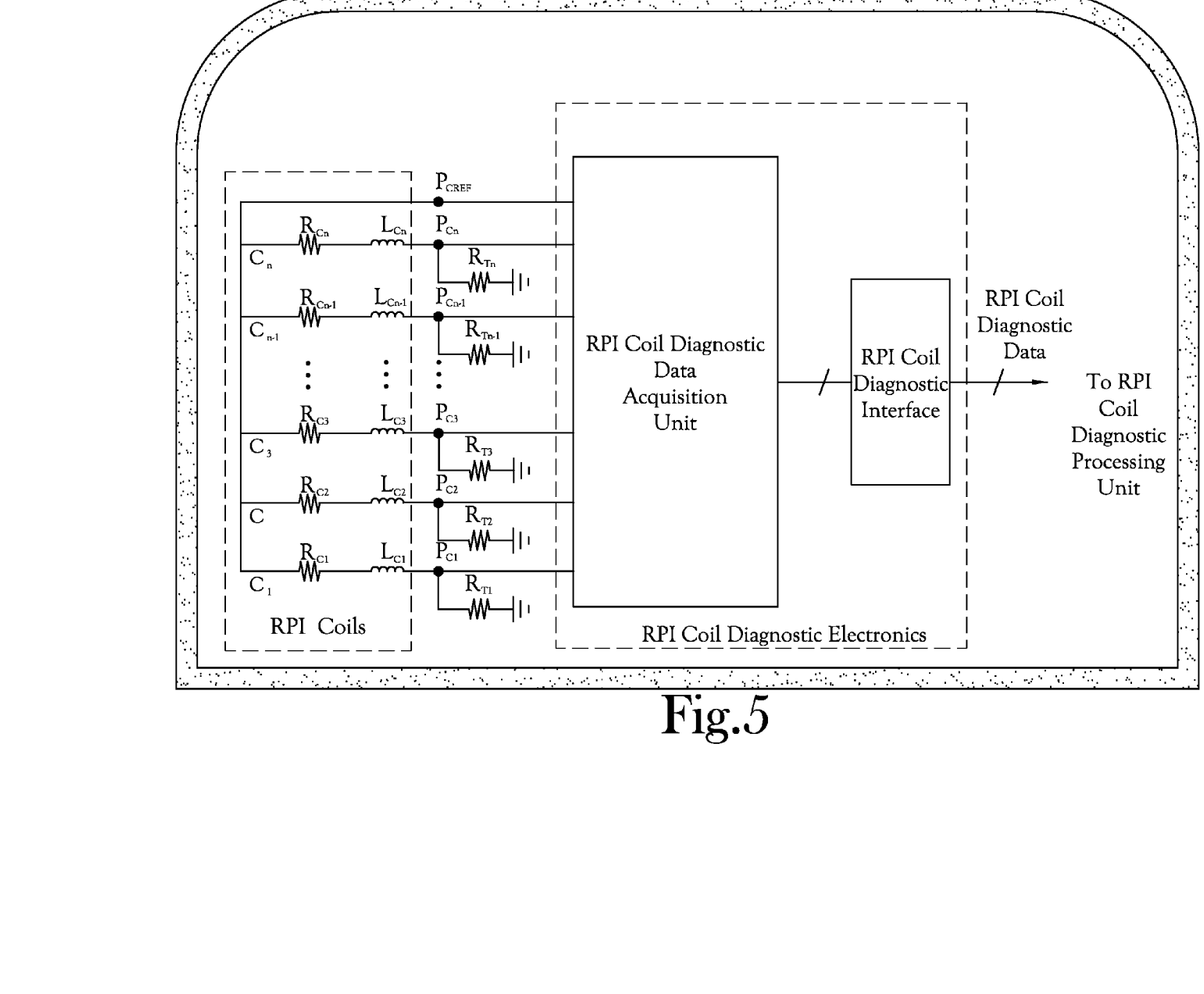
FIG. 5 is alternate embodiment of the RPI coil diagnostic system.

FIG. 5 illustrates an alternate embodiment of the RPI coil diagnostic system that completely replaces conventional DRPI systems. In this embodiment, the RPI coil diagnostic electronics are connected directly to the DPRI coils and communicate directly with the RPI coil diagnostic processing unit located outside containment. The RPI coil diagnostic system may also replace a conventional ARPI system; however, as previously discussed, the detector of a conventional ARPI system differs from the DRPI coils used for drive rod presence sensing. Accordingly, when replacing a conventional ARPI system, the RPI coil diagnostic system necessarily includes the DRPI detection coils. However, in existing ARPI systems the RPI coil diagnostic system can be used, solely, for obtaining measurements from the detector coils for performing coil diagnostics.

Figure 6:
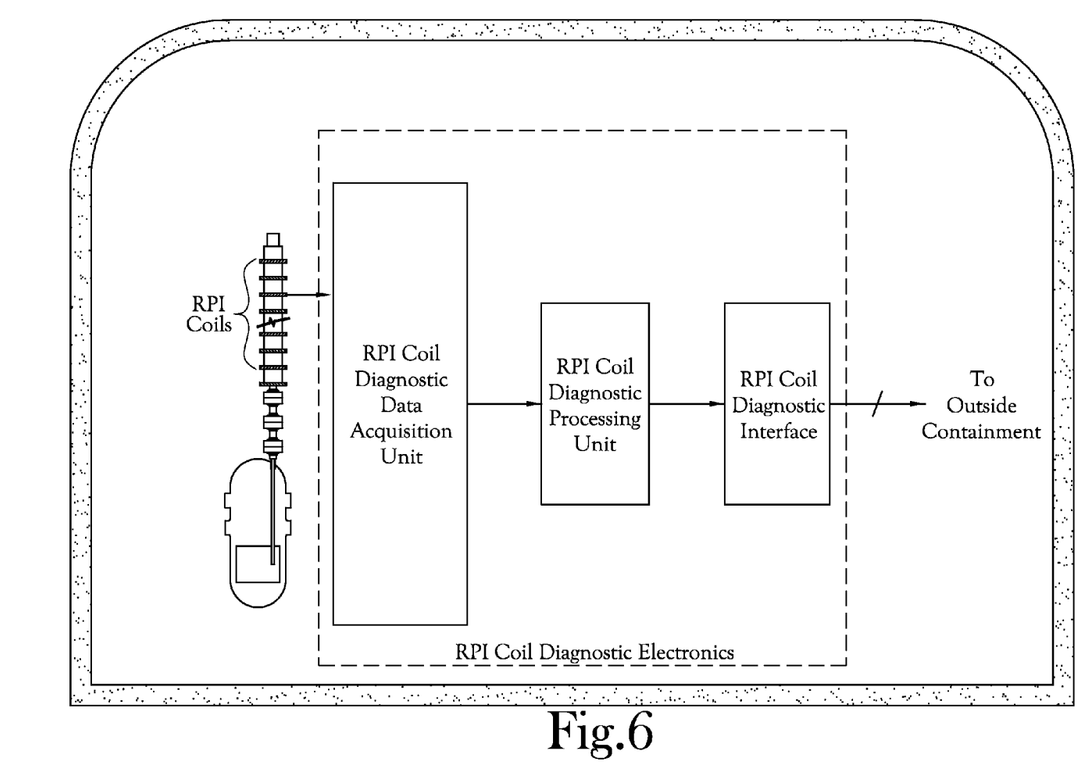
FIG. 6 is yet another embodiment of the RPI coil diagnostic system.

FIG. 6 illustrates an alternate embodiment of the RPI coil diagnostic system where some or all of the processing functions occur in the RPI coil diagnostic electronics. In the embodiment of FIG. 6, the RPI coil diagnostic electronics includes a processing unit receiving data from the RPI coil diagnostic data acquisition unit. In one embodiment, the processing unit in the RPI coil diagnostic electronics calculates the impedance thereby reducing the amount of data that must be transferred to the main control system. In another embodiment, the processing unit in the RPI coil diagnostic electronics assumes all of the processing functions thereby eliminating the need for the RPI coil diagnostic system to provide a separate processing unit in the main control system. In this embodiment, the RPI coil diagnostic electronics communicate directly with other control systems in the PWR, such as the reactor control of the main control system or the logic cabinet in the rod drive system, or simply communicates with the user interface. For example, in a system using the CompactRIO previously described, the FPGA calculates the impedance. One skilled in the art will appreciate that the processing units described herein can be implemented using any number of logic components including controllers and processors without departing from the scope and spirit of the present invention.

From the foregoing description, it will be recognized by those skilled in the art that an RPI coil diagnostic system capable of monitoring the health of the detector coils and the associated connections in a PWR has been provided. The RPI coil diagnostic system is capable of providing diagnostic information about the health of the detector coils and the associated connections while the plant is both online and offline. The diagnostic information includes both historical/baseline values for and real-time determination of the impedance, resistance, and/or inductances of the detector coils. The RPI coil diagnostic system makes the diagnostic information available to the plant operators on a real-time basis. The RPI coil diagnostic system is capable of generating alerts based on the diagnostic information when deviations from the baseline values are detected.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A diagnostic system for performing diagnostics on rod position indication (RPI) coils of a digital rod position indication system (DRPI) of a nuclear reactor, the DRPI system having a plurality of detector coils for monitoring the position of a control rod, the plurality of detector coils being energized by an operating power source of the DRPI system at an operational frequency when the nuclear reactor is operating such that during operation of the nuclear reactor each detector coil generates an electronic signal having identifiable characteristics based on the operational frequency, said diagnostic system comprising:

a data acquisition unit having a number of analog inputs configured to respectively connect to outputs of the plurality of detector coils to monitor electrical signals from the plurality of detector coils, the data acquisition unit having RPI coil diagnostic electronics configured to sample the electronic signals generated from each detector coil to create sampled data indicative of the electrical signals output from the plurality of detector coils while the nuclear reactor is operating, the number of the analog inputs being equal to the number of detector coils in the DRPI system and an additional analog input to receive a reference signal;

a processing unit in electrical communication with said data acquisition unit, the processing unit being configured to receive sampled data from the data acquisition unit corresponding to each detector coil, said processing unit having a calculator to calculate a value of at least one identifiable characteristic of a particular detector coil independently from other detector coils, and a comparator to compare a calculated value of the at least one identifiable characteristic to a reference value corresponding to the particular detector coil without influence from calculated values of other detector coils to indicate the health of the particular detector coil while the nuclear reactor is operating; and an interface unit configured to transmit the sampled data from the data acquisition unit to the processing unit in real time during normal operation of the nuclear reactor, wherein the identifiable characteristics include a combination of impedance and at least one of resistance and inductance.

2. The diagnostic system of claim 1 wherein the calculator calculates an impedance of each detector coil by subtracting a voltage of each said detector coil from a reference voltage produced by the operating power source and dividing by a current passing through each said detector coil, respectively, wherein the operating power source is an ac power source producing the reference voltage at the operational frequency, and the operational frequency is the line frequency of the operating power source.

3. The diagnostic system of claim 1 wherein the processing unit derives an inductance and/or resistance of each detector coil from the impedance of each detector coil, respectively, and anomalies in the inductance and/or the resistance of each detector coil are indicative of a problem with the respective detector coil.

4. The diagnostic system of claim 3 wherein said inductances associated with a plurality of detector coils have a substantially linear relationship, said processing unit including a detector to detect deviations from said substantially linear relationship and to identify the detector coil corresponding to said deviation.

5. The diagnostic system of claim 2 wherein said data acquisition unit measures the current passing through each detector coil of said plurality of detector coils, wherein said identifiable characteristics include an ac voltage component and an ac current component, and wherein said calculator calculates said impedance value from said ac voltage component and said ac current component.

6. The diagnostic system of claim 2 wherein said identifiable characteristics include an ac voltage component relative to a known resistance, wherein said calculator calculates an ac current from said ac voltage component and said known resistance, and wherein said calculator calculates said impedance value from said ac voltage component and said ac current.

7. The diagnostic system of claim 1 wherein the reference value is determined by moving the control rod through an entire range of motion and obtaining and storing a baseline value.

8. The diagnostic system of claim 1 wherein the reference value is obtained during a calibration process of the DRPI system.

9. The diagnostic system of claim 1 wherein the reference value is determined by a calibration process that is repeated, and the results of each calibration process are averaged to determine the reference value.

10. The diagnostic system of claim 1, wherein the data acquisition unit has an independent channel corresponding to the number of detector coils of a coil stack associated with a particular control rod, and the processing unit processes sampled data from all detector coils together in real time.

11. A diagnostic system for performing diagnostics on rod position indication (RPI) coils of a digital rod position indication system (DRPI) of a nuclear reactor, the DRPI system having a plurality of detector coils to monitor a position of a control rod, the detector coils being energized by an operational frequency of the nuclear reactor, the diagnostic system comprising:

a data acquisition unit having a number of analog inputs equal to a number of detector coils within an independent channel of a coil stack of detector coils and a reference input as a reference line, each analog input configured to respectively connect to an output of to a particular detector coil to monitor electrical signals from the plurality of detector coils, the data acquisition unit having RPI coil diagnostic electronics configured to sample electronic signals generated from each detector coil independently to create sampled data indicative of the electrical signals output from each detector coils respectively, while the plurality of detector coils are energized with the operational frequency of the nuclear reactor; and a processing unit configured to receive the sampled electronic signals from each detector coil independently from the data acquisition unit, the processing unit having a calculator to calculate values of identifiable characteristics of each detector coil independently without influence of the other detector coils based on the sampled electronic signals and a comparator to compare the calculated values of the identifiable characteristics of each detector coil to determined deviations based on a relationship between the identifiable characteristics to determine a health of each detector coil;

wherein a deviation beyond a predetermined amount indicates a problem in the health of the corresponding detector coil.

12. The diagnostic system of claim 11, wherein the identifiable characteristics include impedance, resistance, and inductance.

13. The diagnostic system of claim 12, wherein the identifiable characteristics are in a linear relationship.

* * * * *